United States Patent
Freund et al.

(10) Patent No.: US 9,487,296 B2
(45) Date of Patent: Nov. 8, 2016

(54) PASSENGER SERVICE UNIT AND RELATED SYSTEMS

(71) Applicant: Peco Manufacturing Co., Inc., Portland, OR (US)

(72) Inventors: David Freund, Vancouver, WA (US); Brendan Keavney, Oregon City, OR (US); Caleb Flori, Portland, OR (US)

(73) Assignee: Peco Manufacturing Co., Inc., Clackamas, OR (US)

( * ) Notice: Subject to any disclaimer, the term of this patent is extended or adjusted under 35 U.S.C. 154(b) by 126 days.

(21) Appl. No.: 14/464,893

(22) Filed: Aug. 21, 2014

(65) Prior Publication Data

US 2015/0090839 A1    Apr. 2, 2015

Related U.S. Application Data

(60) Provisional application No. 61/884,867, filed on Sep. 30, 2013.

(51) Int. Cl.
*B64D 11/00* (2006.01)
*B64D 13/00* (2006.01)

(52) U.S. Cl.
CPC .......... *B64D 11/0015* (2013.01); *B64D 11/00* (2013.01); *B64D 13/00* (2013.01); *B64D 2011/0038* (2013.01); *B64D 2011/0046* (2013.01); *B64D 2011/0053* (2013.01); *B64D 2013/003* (2013.01); *B64D 2231/025* (2013.01); *Y02T 50/44* (2013.01); *Y02T 50/46* (2013.01)

(58) Field of Classification Search
CPC .... B64D 11/00; B64D 11/0015; B64D 13/00
See application file for complete search history.

(56) References Cited

U.S. PATENT DOCUMENTS

| | | | | |
|---|---|---|---|---|
| 5,651,733 A * | 7/1997 | Schumacher | ........ | B64D 11/00 362/471 |
| 5,803,062 A * | 9/1998 | Aulgur | ........ | B64D 11/00 128/202.26 |
| 6,929,218 B1 * | 8/2005 | Sanford | ........ | B64D 11/0015 244/118.5 |
| 7,520,686 B2 * | 4/2009 | Droege | ........ | G03B 17/02 348/143 |
| 8,166,506 B2 * | 4/2012 | Callahan | ........ | B64D 11/0015 725/71 |
| 8,325,232 B2 * | 12/2012 | Lee | ........ | B64D 45/0015 348/148 |
| 8,489,276 B2 | 7/2013 | Callahan et al. | | |
| 8,505,994 B2 * | 8/2013 | Park | ........ | B60R 1/008 296/24.34 |
| 8,643,211 B2 * | 2/2014 | Meckes | ........ | B60Q 3/0206 307/11 |
| 8,978,644 B2 * | 3/2015 | Rittner | ........ | B64D 11/00 128/202.13 |
| 2006/0113810 A1 * | 6/2006 | Kuhl | ........ | B60R 7/04 296/24.34 |
| 2012/0012707 A1 * | 1/2012 | Schliwa | ........ | B64D 11/003 244/118.5 |
| 2012/0199694 A1 * | 8/2012 | Rittner | ........ | B64D 11/00 244/118.5 |

* cited by examiner

*Primary Examiner* — Justin Benedik
(74) *Attorney, Agent, or Firm* — Wiggin and Dana LLP; Gregory S. Rosenblatt; Jonathan D. Hall

(57) ABSTRACT

A passenger service unit (PSU) for a transport vessel has a unitary chassis with a plurality of apertures extending therethrough. Each one of the apertures is independently sized to receive at least one of a plurality of different modules. Each one of the modules includes one or more PSU fixtures having components different from other ones of the plurality of modules. A representative vessel is a passenger aircraft. Representative modules include vent and passenger reading light module, speaker module, passenger oxygen supply module and display module.

35 Claims, 13 Drawing Sheets

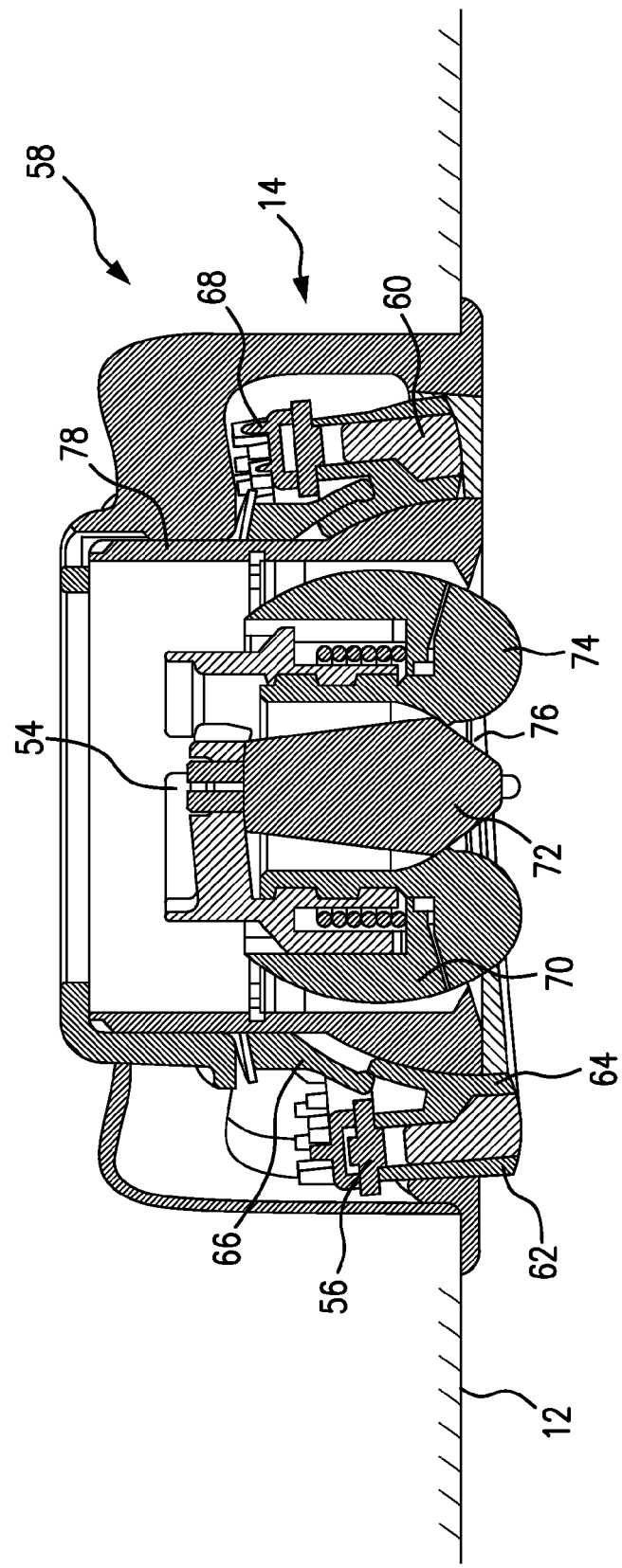

PASSENGER SERVICE UNIT AND RELATED SYSTEMS

CROSS-REFERENCE TO RELATED PATENT APPLICATION

This patent application claims a benefit to the filing date of U.S. Provisional Patent Application Ser. No. 61/884,867, titled "Passenger Service Unit and Related Systems" that was filed on Sep. 30, 2013. The disclosure of U.S. 61/884,867 is incorporated by reference herein in its entirety.

BACKGROUND

This application, and the innovations and related subject matter disclosed herein, (collectively referred to as the "disclosure") generally but not exclusively pertain to aircraft passenger service units (PSUs) and associated systems. As but one example, some innovative PSUs have a chassis configured to structurally couple to a corresponding portion of an aircraft structure (e.g., to an airframe). Such a chassis can also be configured to modularly arrange and/or to retain one or more PSU fixtures.

As used herein, the term "PSU fixture" means an apparatus configured to provide one or more services (e.g., information services, lighting services, environmental services, life safety services, passenger convenience services) to a passenger cabin of an aircraft.

As used herein, the term "gasper" means an air vent configured to discharge a stream of air. Some gaspers have an adjustable configuration to permit adjustment of a pressure loss through the vent, and thereby to permit adjustment of a flow rate of air through the vent.

FIG. 1 shows a PSU fixture 1 as known from the prior art. The fixture 1 has separate components for each feature, passenger oxygen 2, lighting, 3 and gasper 4. Dependent on the pitch between seat rows, a spacer 5 may be employed to fill in gaps between PSU fixtures 1. The components are not interchangeable and there are separate lighting and gasper components. Once assembled in an aircraft cabin, gaps between components and between PSU fixtures need to be sealed such as with a spacer panel or with a specialty function panel, such as a medical outlet, medical communication panel, emergency lighting or temperature sensor. The different components are unique for each airline and for each seating configuration leading to high cost and difficult installation.

With an aging fleet of commercial aircraft, many aircraft cabins have been and are contemplated to be retrofitted with new components, or wholly new interiors. Some passenger airlines attempt to entice paying passengers by providing improved passenger experiences when boarding, during flight, and when disembarking. A passenger's experience during boarding, flight, and disembarking can be influenced by a passenger cabin's available amenities, as well as perceived aesthetic appeal and construction quality. At the same time, fuel costs incurred by an airline can be influenced, at least in part, by an aircraft's weight.

Therefore, there remains a need for improved passenger service units and associated components and systems. For example, there remains a need for relatively lighter weight PSUs. There also remains a need for aesthetically appealing PSUs and associated components. A need also remains for PSUs compatible with an existing fleet of aircraft. A need for different PSU configurations corresponding to different airline customer desires also remains.

SUMMARY

Innovations and related subject matter disclosed herein overcome problems in the prior art and address one or more of the aforementioned or other needs. That said, other features and advantages will become readily apparent to those having ordinary skill in the art from a review of the following detailed description, wherein embodiments of disclosed innovations are shown and described by way of illustration. As will be realized, other and different embodiments of PSUs and associated components and systems incorporating one or more of the disclosed innovations are possible. As well, several disclosed details are capable of being modified in various respects, each without departing from the spirit and scope of the principles disclosed herein. Thus, the detailed description set forth below in connection with the appended drawings is intended to describe examples of the disclosed innovations and is not intended to represent the only contemplated embodiments of the innovations disclosed herein. Instead, the detailed description includes specific details for the purpose of providing a comprehensive understanding of the principles disclosed herein. Accordingly the detailed description, which proceeds with reference to the accompanying drawings, wherein like reference numerals refer to like features throughout, and the drawings are to be regarded as illustrative in nature and not as restrictive.

BRIEF DESCRIPTION OF THE DRAWINGS

The accompanying drawings show embodiments of various aspects of the innovations disclosed herein, unless expressly identified as illustrating a feature from the prior art.

FIG. 13 is a cross-section view of the combination passenger reading light/gasper of FIG. 11.

DETAILED DESCRIPTION

The following describes various principles related to PSUs and associated systems, as well as associated components and subsystems. One or more of the disclosed principles can be incorporated in various system configurations to achieve any of a variety of desired system characteristics. Principles described in relation to particular applications, arrangements, or uses, are merely examples incorporating the innovative principles disclosed herein and are used to illustrate one or more aspects of the various innovative principles. Accordingly, applications, arrangements, uses, and configurations different from those shown in the accompanying drawings and described herein can embody such innovative principles or can be used in applications not described herein in detail, such as, for example, in automobile passenger compartments, railway passenger compartments, as well as in building interiors, or even in outdoor, unprotected environments. Accordingly, such alternative embodiments also fall within the scope of this disclosure.

Figure 1:
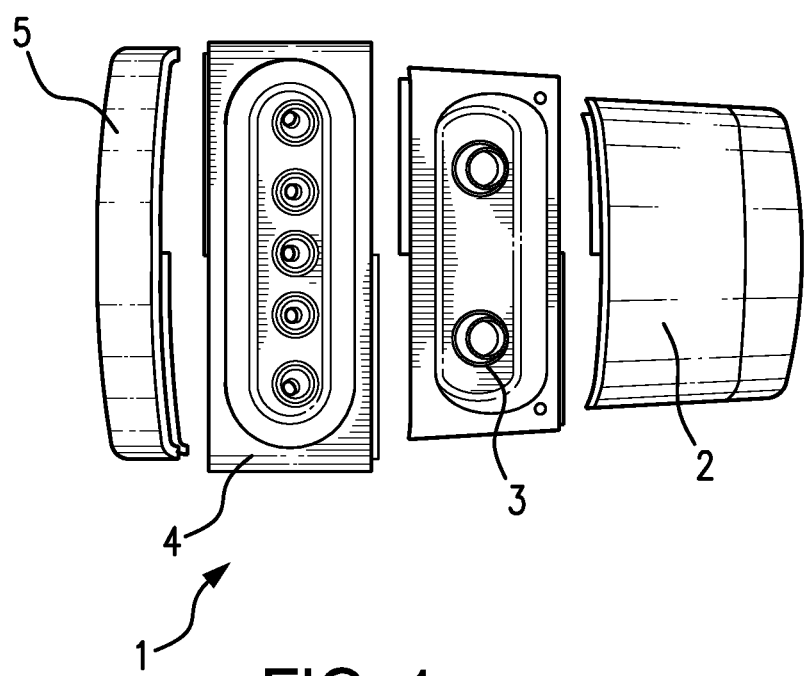
FIG. 1 illustrates passenger service unit (PSU) as known from the prior art.
Figure 2:
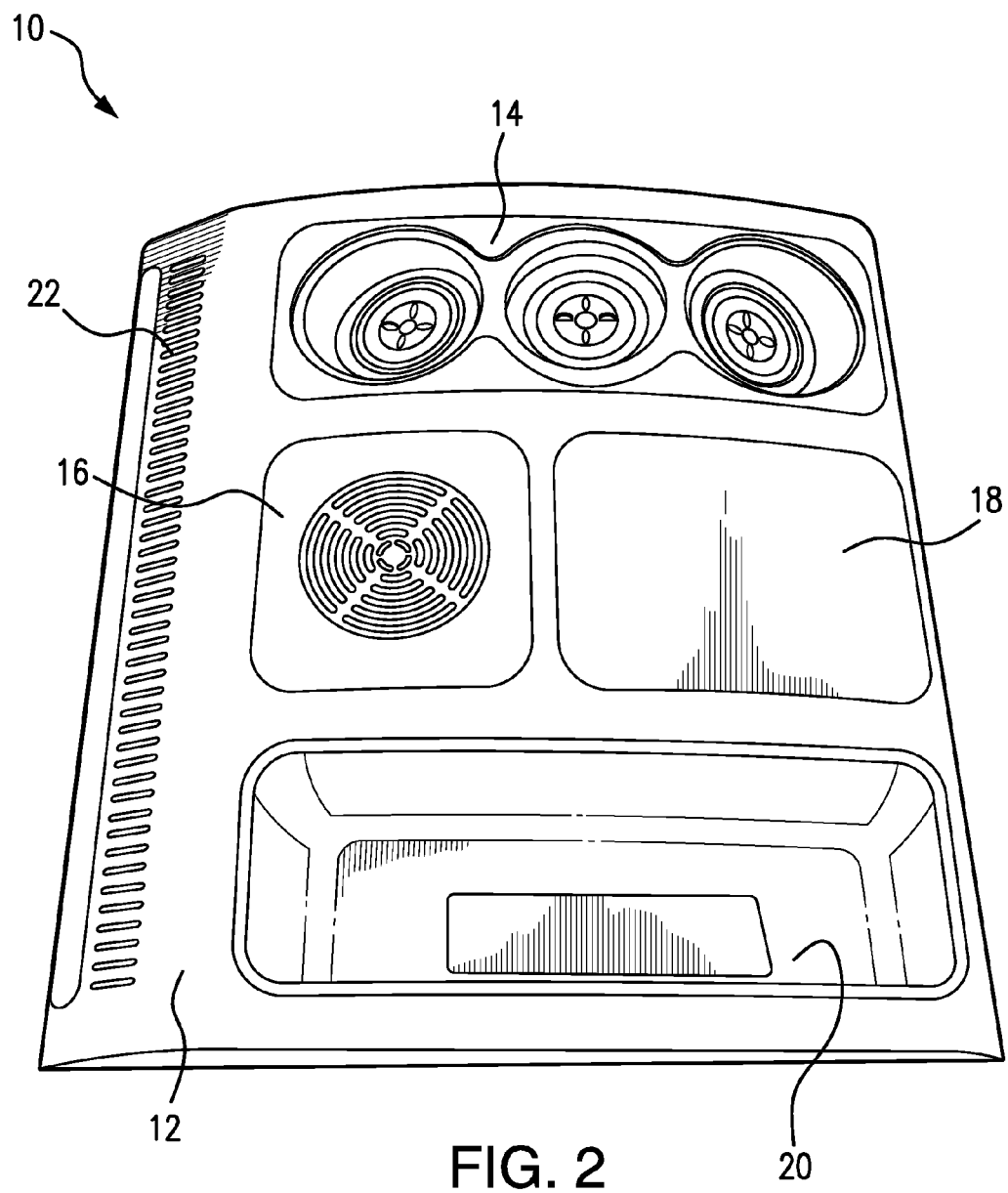
FIG. 2 is a first view of a PSU having a unitary chassis as disclosed herein.
Figure 3:
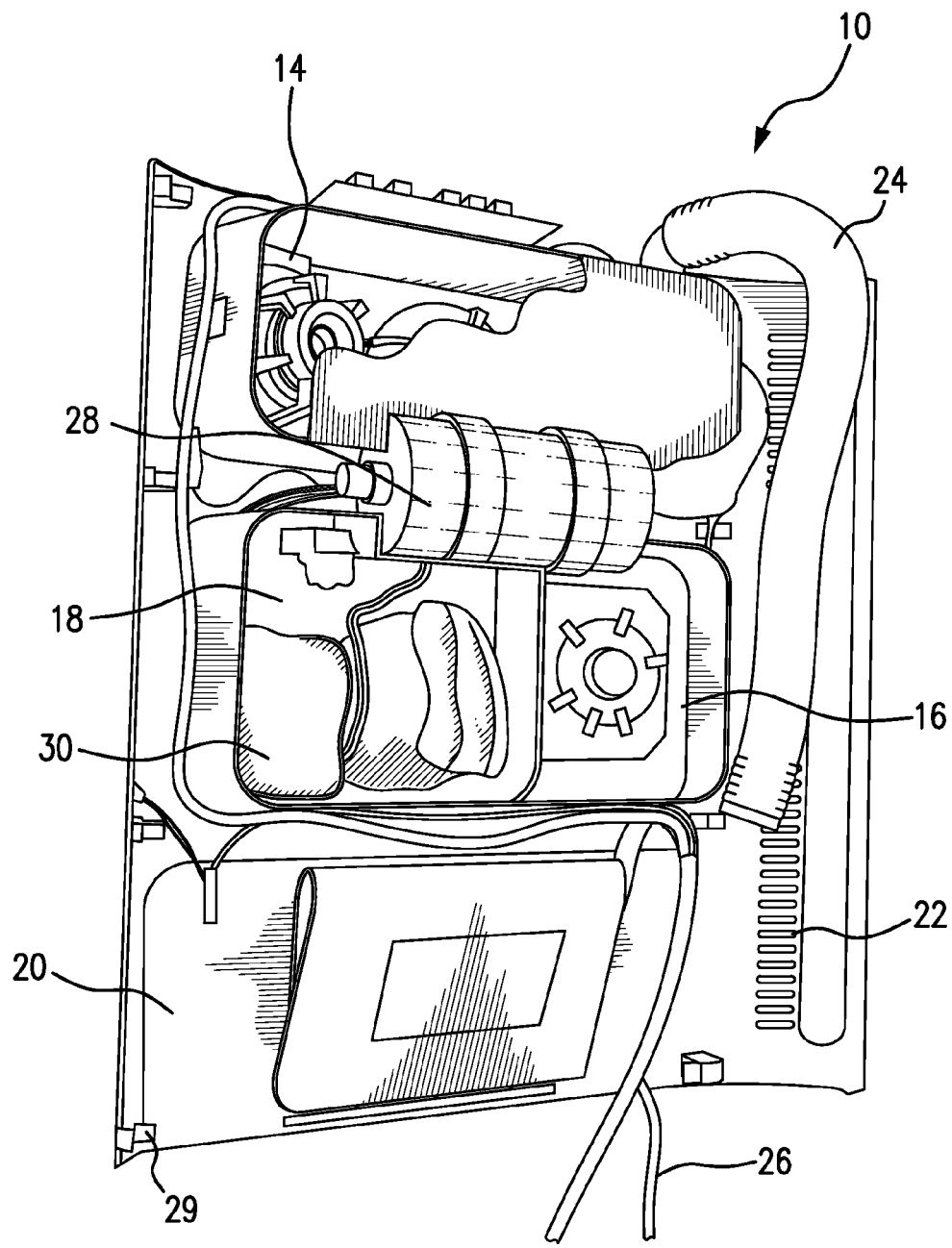
FIG. 3 is a second view of the PSU having a unitary chassis as disclosed herein.

Some innovative passenger service units (PSUs) have a chassis. Some chassis have a unitary construction. Disclosed PSU chassis can have a unitary construction. The PSU chassis can be affixed to or otherwise structurally coupled to a portion of an airframe. FIG. 2 illustrates a PSU 10 having a unitary chassis 12. "Unitary" means that the chassis supporting the various modules is formed as a single piece, without gaps requiring subsequent sealing by insertion of separate panels. Cut-outs in the chassis allow for the insertion of interchangeable modules. Exemplary in FIG. 2, a first cut-out has received vent and passenger reading light module 14, speaker module 16, passenger oxygen supply module 18 and display module 20. Vents 22 in the chassis 12 facilitate circulation of cabin air. FIG. 3 illustrates the back side of the PSU 10 showing the positioning of vent and passenger reading light 14, speaker 16, passenger oxygen supply 18 and display 20 modules. Also illustrated are an exhaust hose 24 coupled to vents 22 and power supply line 26. A suitable oxygen source, such as oxygen gas generator 28, connects to oxygen masks 30 contained within the passenger oxygen supply module 18. A plurality of structural couplers 29 are configured to structurally couple the chassis 12 to a portion of an airframe.

Figure 4A:
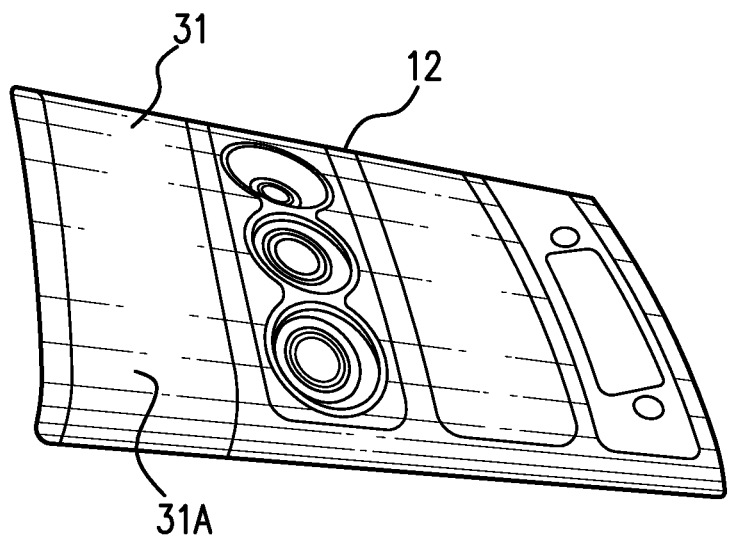
FIG. 4A illustrates a collapsed integrated spacer for use with the PSU with unitary chassis.
Figure 4B:
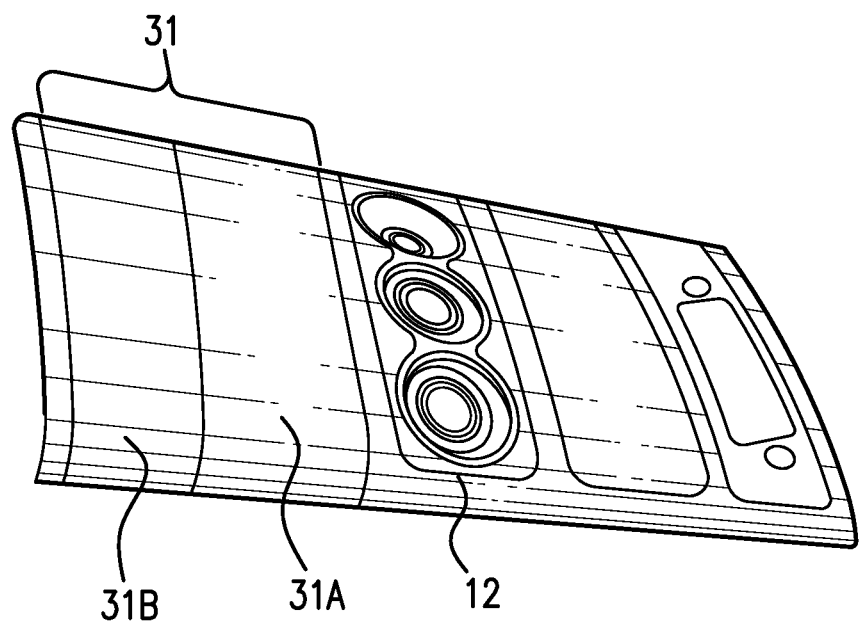
FIG. 4B illustrates an expanded integrated spacer for use with the PSU with unitary chassis.

Referring to FIGS. 4A and 4B, the chassis 12 may include an integral adjustable spacer 31 that includes portions 31A, 31B that slidably engage each other. The integral adjustable spacer 31 is shown in a collapsed position in FIG. 4A with portion 31B underneath portion 31 A and is shown in an extended position in FIG. 4B with portion 31B extended to be adjacent to portion 31A. The amount of extension of portion 31B is variable to accommodate varying seat pitches according to the airlines' passenger seating configurations.

Figure 5:
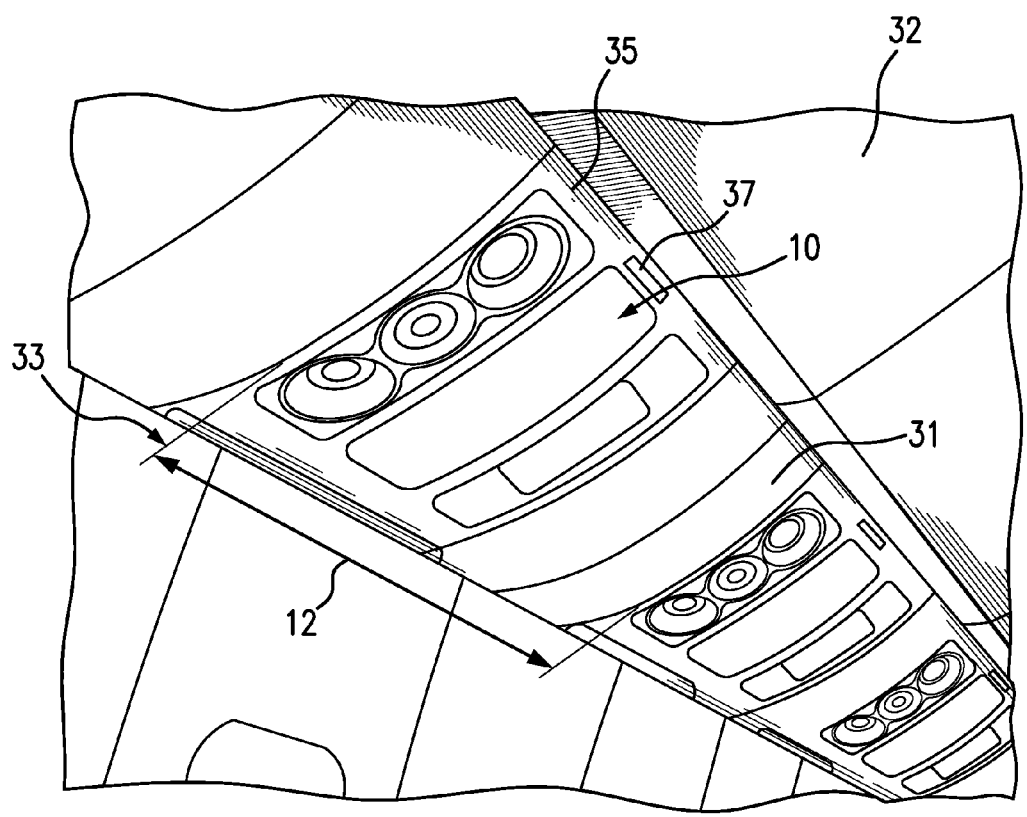
FIG. 5 shows the PSU with unitary chassis installed in a passenger aircraft.

FIG. 5 shows the installation of PSU's 10 into the cabin of an aircraft, above the passenger seats and extending between a wall 33 of the aircraft and luggage bin 32. Among the features of the PSU 10 design are a single PSU chassis 12 replaces multiple assembly panels. The module inserts may be configured for any number of seats in the rows, typically between 2 and 5, with use of the same chassis 12. The integral adjustable spacer 31 enables use of the same chassis 12 with variable seat pitches as specified by the airlines. There are no gap seals between components and an integrated speaker (16 in FIG. 2) leads to improved performance. Integrated in-board lighting system 35 is a multi-functional feature useful to illuminate as an attendant call light, seat row marker 37, emergency exit lighting, or other source of communication with passengers.

The PSU 10 has a reduced weight compared to conventional PSU's. As shown in Table 1, there may be up to a 24% weight savings. On an average sized commercial jet, this could represent a 260 pound reduction in weight.

TABLE 1

| PSU Concept | Reduction in Weight |
| --- | --- |
| Advanced Resin Technology | 2% |
| Unitary Design | 4% |
| Reading Light/Gasper Integration | 2% |
| Replace overhead Electronics Unit (OEU) with Individual Printed Circuit Board | 3% |
| Eliminate Gap Seals | 1% |
| High Efficiency 22-Minute Oxygen Generators | 12% |
| Combine Functionality of Sidewall Washlight | TBD |
| Wireless Reading Light Switching | TBD |
| Energized PSU Rails to Eliminate Wiring | TBD |
| Total Estimated PSU Weight Savings | ~24% (~260 pounds) |

Some disclosed chassis define at least one aperture sized to receive any of a plurality of interchangeable modules. For example, some interchangeable modules have a respective arrangement of one or more PSU fixtures. Some interchangeable modules are arranged differently from each of the other interchangeable modules in the plurality of modules.

Figure 6:
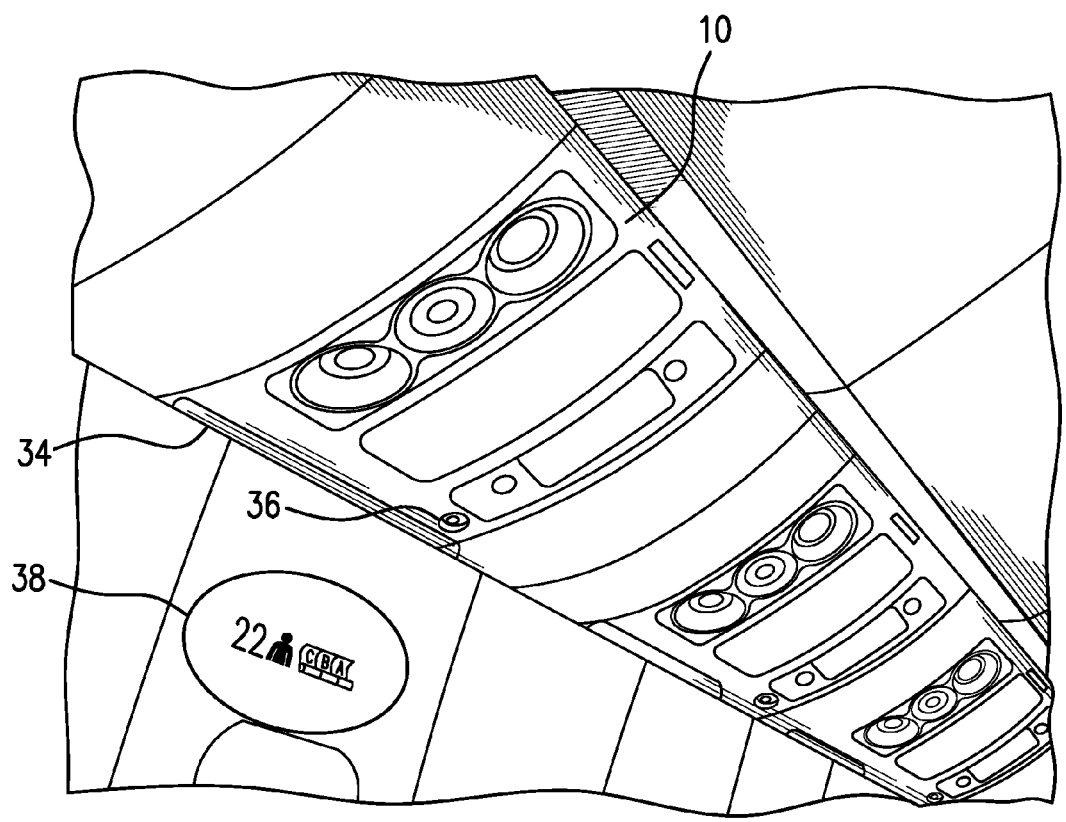
FIG. 6 illustrates an alternative PSU with unitary chassis as disclosed herein.

FIG. 6 shows a PSU 10 further including a sidewall washlight 34 and a projector 36. Sidewall washlight 34 is typically a light emitting diode (LED) to reduce weight and space. Utilizing an LED also reduces maintenance costs to the airline as it is integrated into the chassis to reduce installation costs. LEDs rarely need replacement, therefore, there are no bulbs to replace, reducing labors costs to the airline. The sidewall washlight 34 may produce white light for low level lighting, such as for a night time flight, or the light may be a color, such as representative of the carrier or the nationality of the carrier.

The projector 36 may project an image 38 on the cabin wall 30. During passenger boarding, the seat row may be projected as shown in FIG. 6. The projected message may change. For example, prior to take-off, the number of minutes to departure and "Fasten Seat Belts" may be projected. During flight, the time until arrival or meal choices may be displayed. In an emergency, an arrow pointing toward the nearest exit may be displayed enabling passengers to see exit lighting directions by looking forward rather than being required to look at the floor.

As but one example, one of the plurality of interchangeable modules can have a vent and a light, and another of the plurality of modules can have an information display. Such an information display can be configured to receive an electromagnetic signal and to convert the electromagnetic signal to a human-recognizable display of information.

Figure 7:
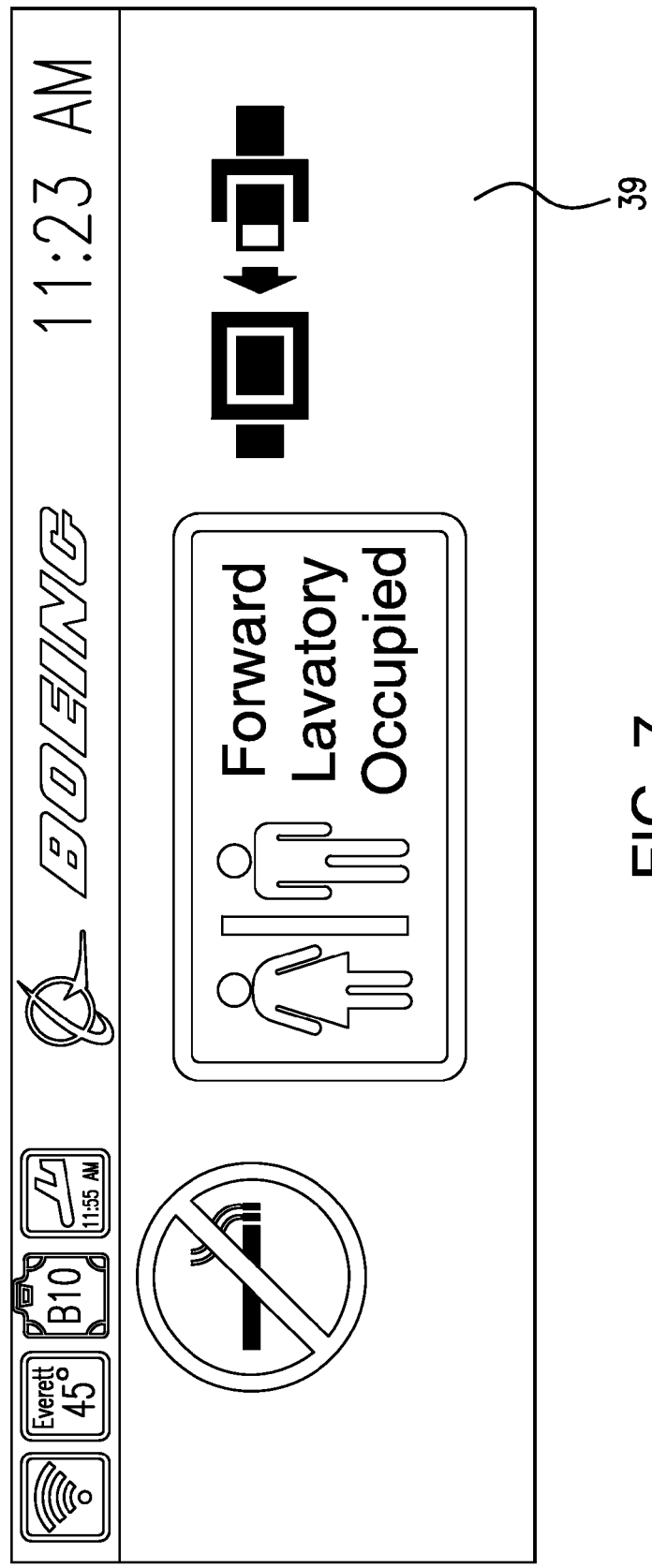
FIG. 7 illustrates exemplary signage for use with a display module as disclosed herein.

With reference to FIG. 7, the display 39 is a high resolution display. Features of an exemplary display are set forth in Table 2.

TABLE 2

| Display Property | Features |
| --- | --- |
| Mechanical | Physically interchangeable module |
| Active Display Area | Up to 20 mm × 150 mm |

TABLE 2-continued

| Display Property | Features |
| --- | --- |
| Resolution | 64 (RGB) × 256 pixels typical |
| Color Palette | 256-16M depending on bandwidth of interface and end use requirements |
| Display Technology | Thin Film Transistor (TFT) LCD |
| Contrast Ratio | 200 typical |
| Backlight Type | LCD |
| Display Luminance | 100 candles/m$^2$ (nits) |
| Module Power | 1 Watt maximum |
| View Angles | 45° normal to surface |
| Operating Temperature | 0° C.-40° C. |
| Storage Temperature | −20° C.-60° C. |
| Interface | ARINC 629 or similar databus |
| Weight | Similar to existing information sign assemblies |
| Environmental | Radio Technical Commission for Aeronautics (RTDC) Document DO-160, environmental conditions and test procedures for airborne equipment |
| Controller and Interface | Integral to information sign assembly |

Figure 8:
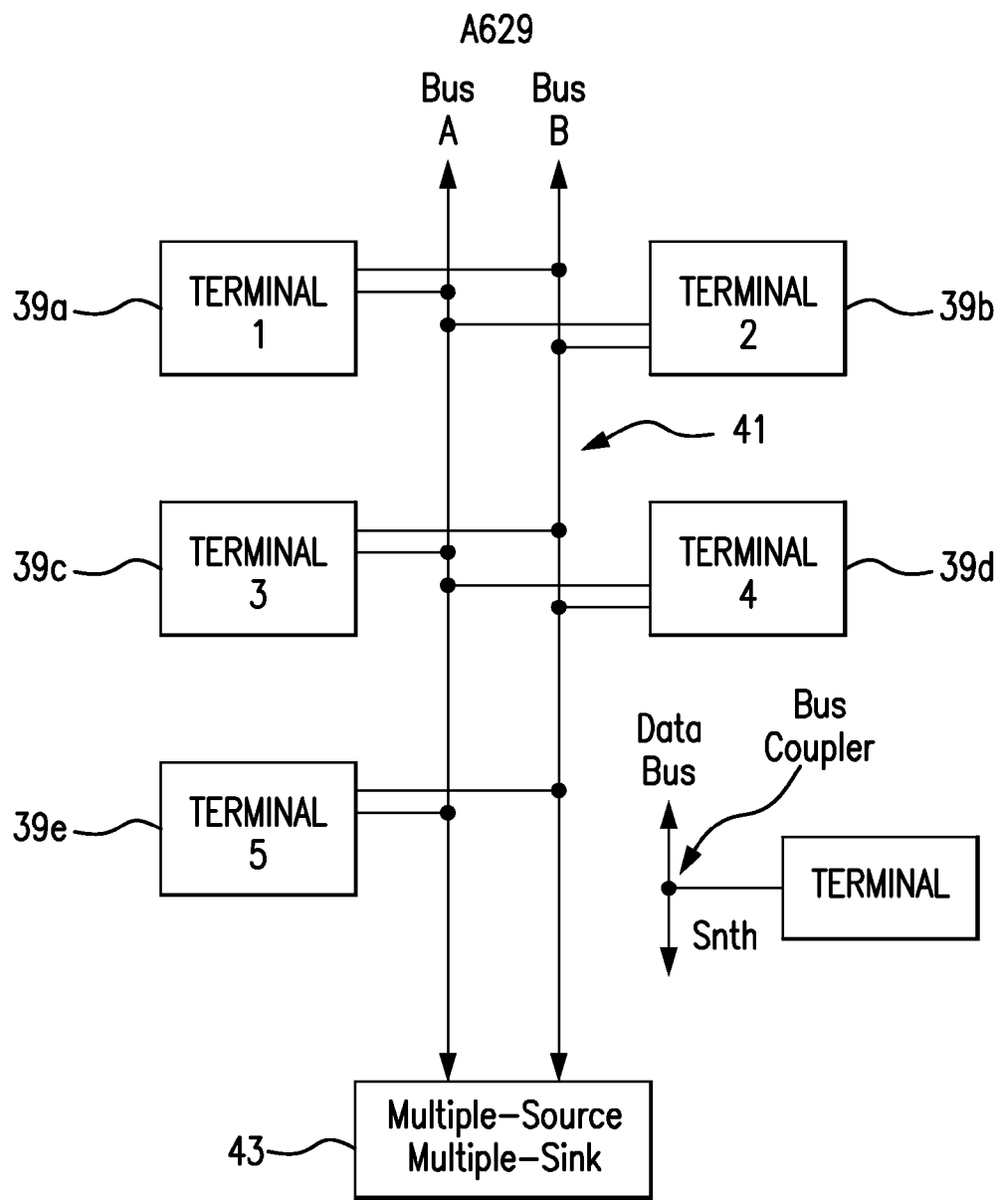
FIG. 8 schematically illustrates a data bus for use with the display module of FIG. 7.
Figure 9:
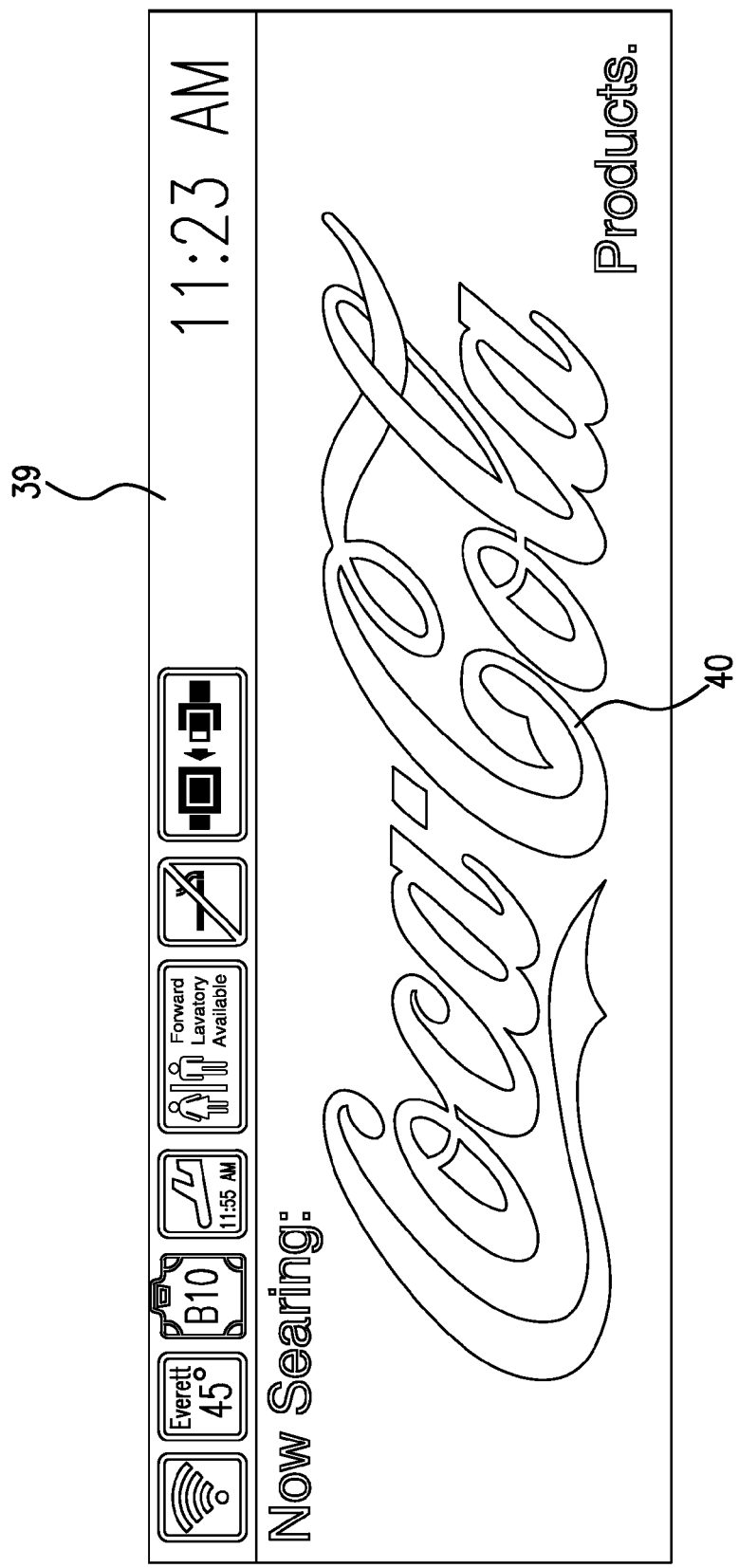
FIG. 9 illustrates alternative signage for use with the display module of FIG. 7.

FIG. 8 schematically illustrates an ARINC 629 data bus 41. The data bus 41 operates as a multiple source of data 43, multiple sink system. The displays 39a-39e receive signals from the ARINC 629 bus 41 containing information to be displayed. Referring back to FIG. 7, the display 39 is infinitely configurable and tailored by the airline to its customers. Each airline can create its own options and icons. The display 39 is managed through a cabin control panel. As shown in FIG. 9, the display 39 may be monetized by inclusion of advertising graphics 40. Further, the brightness of the display may be varied for passenger convenience. Brightness may be determined by cabin lighting modes or be adjustable in response to passenger input. The display may also flash at a higher brightness to attract the attention of the passenger.

Figure 10A:
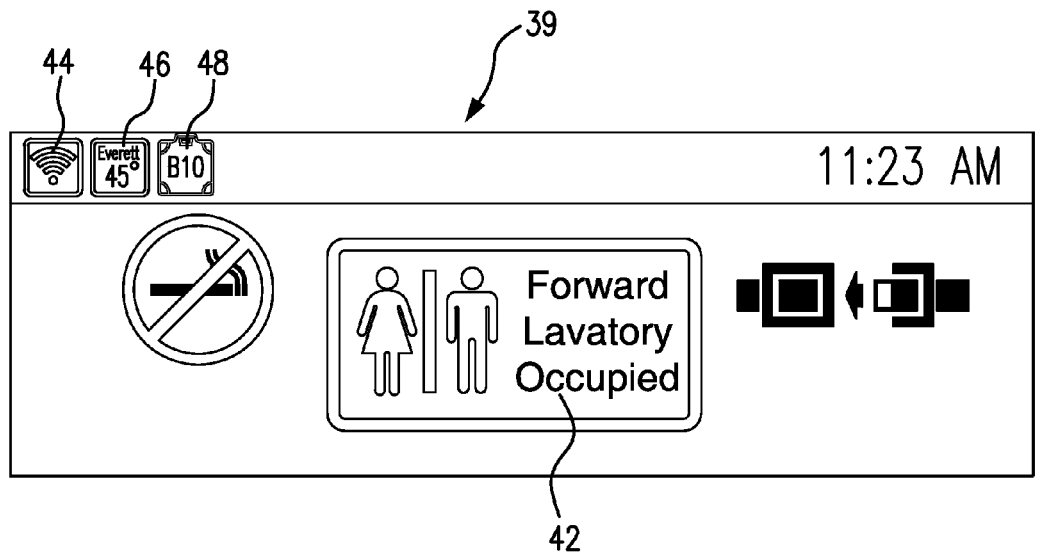
FIG. 10A illustrates an interactive feature in accordance with an embodiment of the display module of FIG. 7.
Figure 10B:
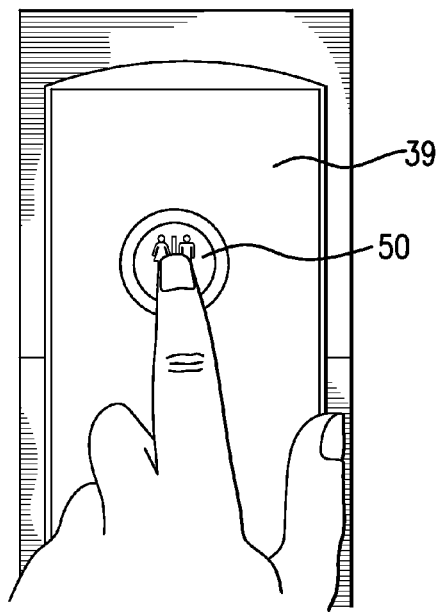
FIG. 10B illustrates a touch screen icon for the interactive feature of FIG. 10A.

With reference to FIG. 10A, the display 39 may communicate with sensors located throughout the aircraft (not shown) to provide the passenger with useful information, such as lavatory occupancy 42, wifi availability 44, temperature at destination 46, and baggage claim carousel location 48. With reference to FIG. 10B, The display 39 may include touch screen icons 50 to receive passenger inputs such as request to identify available lavatories and present in-flight location.

Figure 11:
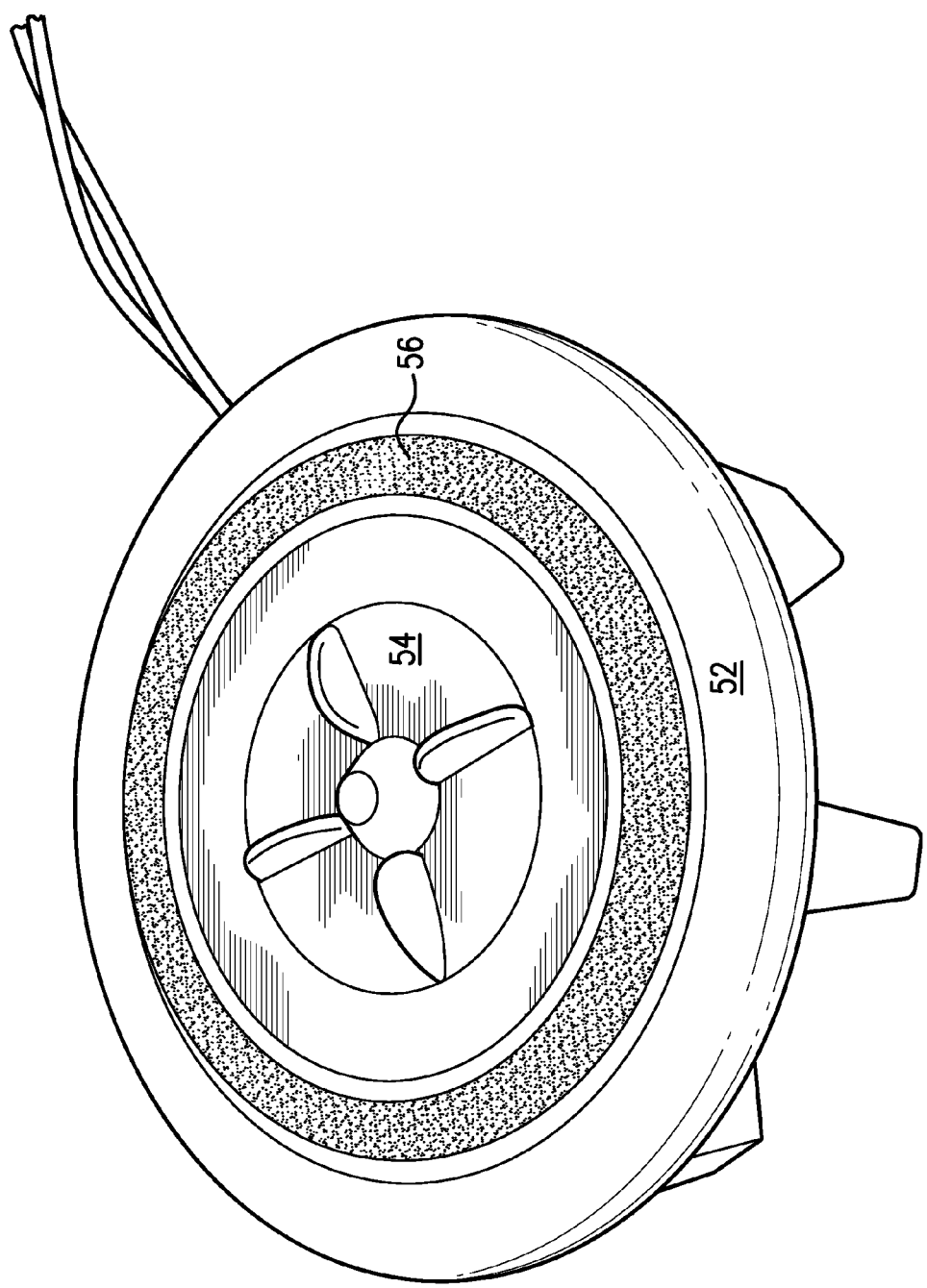
FIG. 11 is a first view of a combination passenger reading light/gasper as disclosed herein.
Figure 12:
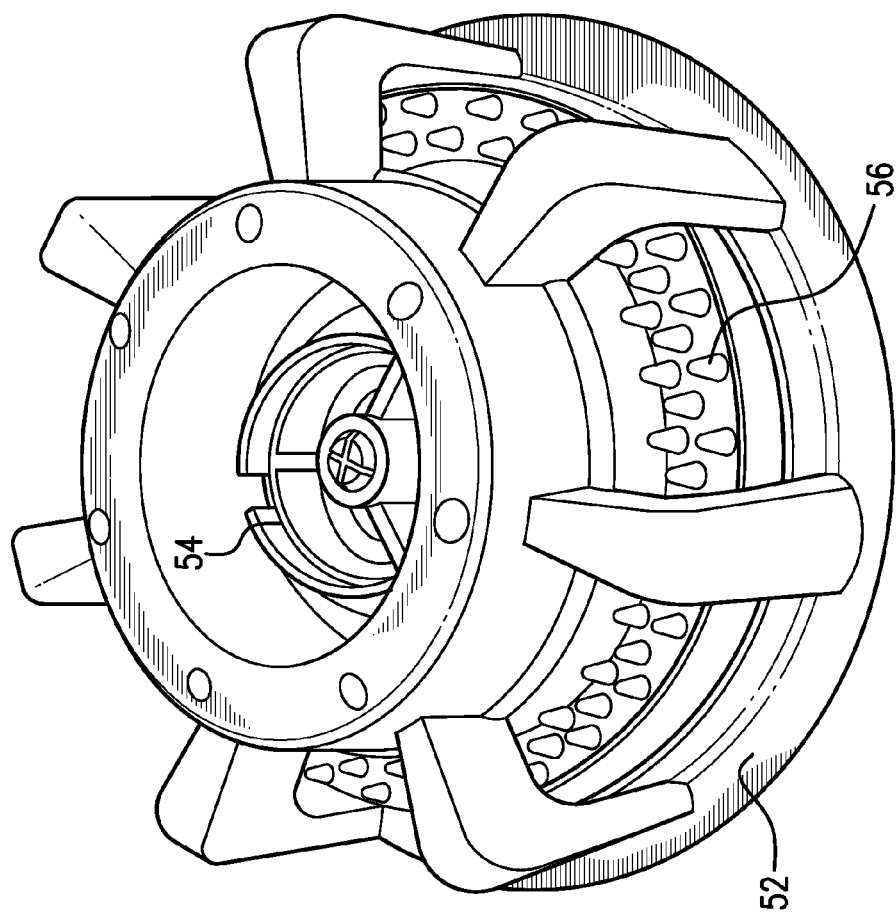
FIG. 12 is a second view of the combination passenger reading light/gasper of FIG. 11.

With reference to FIGS. 11 and 12, some interchangeable modules have a single unit 52 that includes an adjustable gasper 54 and an adjustable passenger reading light 56. Such an adjustable gasper 54 and adjustable passenger reading light 56 can be independently movable relative to each other. For example, the adjustable gasper 54 and the adjustable passenger reading light 56 can be arranged concentrically relative to each other. In particular, the adjustable passenger reading light and the gasper can be concentrically arranged relative to each other when the adjustable gasper and the adjustable passenger reading light are positioned in respective neutral positions. The passenger reading light can have an annular lens spaced from and positioned radially outwardly of the gasper.

As shown in FIG. 13, the vent and passenger reading light module 14 fits within the unitary chassis 12 with the bulk 58 of the module 14 on the side of the chassis 12 opposite the passengers of the aircraft. The passenger reading light 56 is typically a light emitting diode (LED) ring and circumscribes the gasper 54. Other components of the passenger reading light 56 include a lens 60 and a lens housing 62. A first gimbal 64 enables rotation of the passenger reading light 56 through an angle of from about 10° to about 30° as controlled by pressure plate 66. A heat sink 68 directs any heat generated by passenger reading light 56 away from the passengers.

The gasper 54 is centrally disposed within the ring formed by passenger reading light 56. A second gimbal 70 enables rotation of the gasper independently of rotation of the light 56. In some instances, the first gimbal 64 and the second gimbal 70 are configured to permit the gasper 54 and the passenger reading light 56 to orbit through substantially similar solid angles of between about 10° and 30°. The first gimbal and the second gimbal can be configured to permit the air vent and the passenger reading light, respectively, to orbit through a corresponding solid angle of up to about 30 degrees. In some instances, the first gimbal 64 and the second gimbal 70 are configured to provide different degrees of movement through a solid angle. In some embodiments, such a solid angle measures up to about 20 degrees, such, for example, up to between about 10 degrees and about 15 degrees.

The gasper 54 includes an air restrictor 72 that is moveable by rotation of finger grips 74 to adjust the vent aperture 76.

The adjustable passenger reading light 56 as disclosed herein can have the annular lens 60 positioned radially outwardly of the gasper 54. In some instances, an annular frame member 78 is positioned between the gasper 56 and the lens 60. The adjustable passenger reading light 56 may also be the sole component of a module, without inclusion of a gasper.

In addition, some disclosed passenger service unit have one or more of a lens for a cabin lighting system, a cabin sidewall wash light, a vent configured to discharge air from an environmental control system for a passenger cabin. Some disclosed PSUs have a projector configured to project a media display on a sidewall of a passenger cabin.

Methods are also disclosed. For example, a method of providing service to one or more occupants of an aircraft can include operating an aircraft having an air vent and a light. A flow of air can be provided through the vent. Power can be provided to the light. The light and the vent can be arranged as set forth herein.

Other methods include providing access to an interior region of an aircraft by an occupant and projecting a display of information onto a wall of the interior region. For example, an aircraft can have a projector positioned in a passenger service unit. The act of projecting a display can include operating the projector.

Also disclosed are aircraft. For example, an aircraft can include any PSU arranged as disclosed herein. Also disclosed are other fauns of transit, such as space craft, automobiles, trains, and boats. Such other forms of transit can include any one or more features of technologies disclosed herein.

Thus, incorporating the principles disclosed herein, it is possible to provide a wide variety of embodiments of the innovative principles described herein.

Directions and references (e.g., up, down, top, bottom, left, right, rearward, forward, etc.) may be used to facilitate discussion of the drawings but are not intended to be limiting. For example, certain terms may be used such as "up," "down,", "upper," "lower," "horizontal," "vertical," "left," "right," and the like. These terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" as well as "and" and "or." Moreover, all patent and non-patent literature cited herein is hereby incorporated by references in its entirety for all purposes.

The principles described above in connection with any particular example can be combined with the principles described in connection with any one or more of the ,other examples. The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

Thus, in view of the many possible embodiments to which the disclosed principles can be applied, it should be recognized that the above-described embodiments are only examples and should not be taken as limiting in scope. We therefore reserve all rights to the subject matter disclosed herein, including the right to claim all that comes within the scope and spirit of the following paragraphs.

What is claimed:

1. A passenger service unit (PSU) for a transport vessel, comprising:
   a unitary chassis having a plurality of apertures extending therethrough with each aperture of said plurality of apertures independently sized to receive at least one of a plurality of different modules, wherein each one of the modules includes one or more PSU fixtures having components different from other ones of the plurality of modules; and
   wherein one end of said unitary chassis is an integral adjustable spacer having a first portion slideably engaged to a second portion wherein said second portion is disposed behind said first portion when collapsed and disposed adjacent said first portion when expanded.

2. The passenger service unit of claim 1 wherein said second portion is sized to accommodate varying pitches of airlines' passenger seating configurations.

3. The passenger service unit of claim 1 wherein one of said plurality of modules includes at least one passenger reading light.

4. The passenger service unit of claim 3 wherein the number of passenger reading lights in a single module is dependent on the vessels' seating configuration.

5. The passenger service unit of claim 3 wherein each passenger reading light is a ring-shaped light emitting diode (LED).

6. The passenger service unit of claim 5 wherein a gimbal enables rotation of said passenger reading light through an angle of up to 30°.

7. The passenger service unit of claim 6 wherein a heat sink is adjacent said passenger reading light on a side opposite the side adjacent a vessel passenger seat.

8. The passenger service unit of claim 6 wherein a gasper is circumscribed by said passenger reading light.

9. The passenger service unit of claim 8 wherein a second gimbal enables rotation of said gasper through an angle of up to 30°.

10. The passenger service unit of claim 9 wherein the gasper and the passenger reading light are independently movable relative to each other.

11. The passenger service unit of claim 3 wherein a second one of the plurality of modules includes an information display configured to receive an electromagnetic signal and to convert the electromagnetic signal to a human-recognizable display of information.

12. The passenger service unit of claim 11 wherein said information display communicates with sensors located in the vessel to display information useful to a passenger.

13. The passenger service unit of claim 12 wherein said information display includes a touch screen portion enabling said passenger to input a query.

14. The passenger service unit of claim 11 wherein the information display includes at least one advertising icon.

15. A passenger service unit of claim 11 wherein a cabin sidewall washlight is disposed on an edge of said unitary chassis adjacent a sidewall of the vessel.

16. The passenger service unit of claim 15 wherein the sidewall washlight is a light emitting diode.

17. The passenger service unit of claim 11 wherein an edge of said unitary chassis opposite said sidewall of said vessel includes a multi-functional in-board lighting system.

18. The passenger service unit of claim 17 wherein said in-board lighting system is effective to illuminate an attendant call light, illuminate a seat row marker and provide emergency exit lighting.

19. The passenger service unit of claim 11 wherein a light emitting projector extends from said unitary chassis and is effective to project information onto a sidewall of said vessel.

20. A passenger service unit (PSU) for a transport vessel, comprising:
   a unitary chassis having a plurality of apertures extending therethrough with each aperture of said plurality of apertures independently sized to receive at least one of a plurality of different modules, wherein each one of the modules includes one or more PSU fixtures having components different from other ones of the plurality of modules;
   wherein one of said plurality of modules includes at least one passenger reading light; and
   wherein a heat sink is adjacent said passenger reading light on a side opposite the side adjacent a vessel passenger seat.

21. The passenger service unit of claim 20 wherein the number of passenger reading lights in a single module is dependent on the vessels' seating configuration.

22. The passenger service unit of claim 20 wherein each passenger reading light is a ring-shaped light emitting diode (LED).

23. The passenger service unit of claim 22 wherein a gimbal enables rotation of said passenger reading light through an angle of up to 30°.

24. The passenger service unit of claim 22 wherein a gasper is circumscribed by said passenger reading light.

25. The passenger service unit of claim 24 wherein a second gimbal enables rotation of said gasper through an angle of up to 30°.

26. The passenger service unit of claim 25 wherein the gasper and the passenger reading light are independently movable relative to each other.

27. The passenger service unit of claim 20 wherein a second one of the plurality of modules includes an information display configured to receive an electromagnetic signal and to convert the electromagnetic signal to a human-recognizable display of information.

28. The passenger service unit of claim 27 wherein said information display communicates with sensors located in the vessel to display information useful to a passenger.

29. The passenger service unit of claim 28 wherein said information display includes a touch screen portion enabling said passenger to input a query.

30. The passenger service unit of claim 27 wherein the information display includes at least one advertising icon.

31. A passenger service unit of claim 27 wherein a cabin sidewall washlight is disposed on an edge of said unitary chassis adjacent a sidewall of the vessel.

32. The passenger service unit of claim 31 wherein the sidewall washlight is a light emitting diode.

33. The passenger service unit of claim 27 wherein an edge of said unitary chassis opposite said sidewall of said vessel includes a multi-functional in-board lighting system.

34. The passenger service unit of claim 33 wherein said in-board lighting system is effective to illuminate an attendant call light, illuminate a seat row marker and provide emergency exit lighting.

35. The passenger service unit of claim 27 wherein a light emitting projector extends from said unitary chassis and is effective to project information onto a sidewall of said vessel.

* * * * *